United States Patent

Menzies

[15] 3,671,789
[45] June 20, 1972

[54] SYNCHRONOUS RELUCTANCE MOTORS HAVING ROTOR SEGMENTS OF EXTENDED POLE SPAN

[72] Inventor: Robert W. Menzies, Winnipeg, Manitoba, Canada

[73] Assignee: Canadian Patents and Development Limited, Ottawa, Ontario, Canada

[22] Filed: Jan. 19, 1971

[21] Appl. No.: 107,640

[52] U.S. Cl. .............................. 310/163, 310/183, 310/197, 310/212
[51] Int. Cl. ................................................. H02k 19/06
[58] Field of Search .................. 310/162, 163, 183, 197, 211, 310/212, 166

[56] References Cited

UNITED STATES PATENTS

| | | | |
|---|---|---|---|
| 2,939,025 | 5/1960 | Williford | 310/163 X |
| 1,653,946 | 12/1927 | Clausen | 310/162 UX |
| 2,733,362 | 1/1956 | Bauer et al | 310/162 |
| 3,448,310 | 6/1969 | Lawrenson | 310/162 |
| 2,989,655 | 6/1961 | Honsinger | 310/162 X |

Primary Examiner—J. V. Truhe
Assistant Examiner—B. A. Reynolds
Attorney—Roman J. Filipkowski

[57] ABSTRACT

In reluctance motors having rotors with segmentally disposed, axially extended, radially laminated stacks of steel strips carried on a conducting core, improved synchronous performance and increased asynchronous torque are achieved when the rotors are modified to associate only one segmental body with each pair of adjacent MMF poles of the stator field. The modification is actually a simplification, namely the span of each segmental body is peripherally extended to nearly the span of two adjacent stator poles, whereby the steel laminae carry a higher peak magnetic flux centered on the strips lying at the radial mid-depth position of a stack. A higher total flux is also realized and the flux distribution in the air gap is more nearly sinusoidal, lacking the gaps characterizing flux patterns of prior art rotors. Odd-numbered harmonic coefficients of the flux distribution are thus minimized. Considerable savings in construction are also realized. Motors are described ranging from one pair of rotor poles up to four pairs, although the invention extends to any practicable higher pole numbers.

8 Claims, 9 Drawing Figures

ROBERT W. MENZIES
INVENTOR.

BY Lawrence E. Laubscher
ATTORNEY

ROBERT W. MENZIES
INVENTOR.

BY
Lawrence E. Laubscher
ATTORNEY

ROBERT W. MENZIES
INVENTOR.

BY Lawrence E. Laubscher
ATTORNEY.

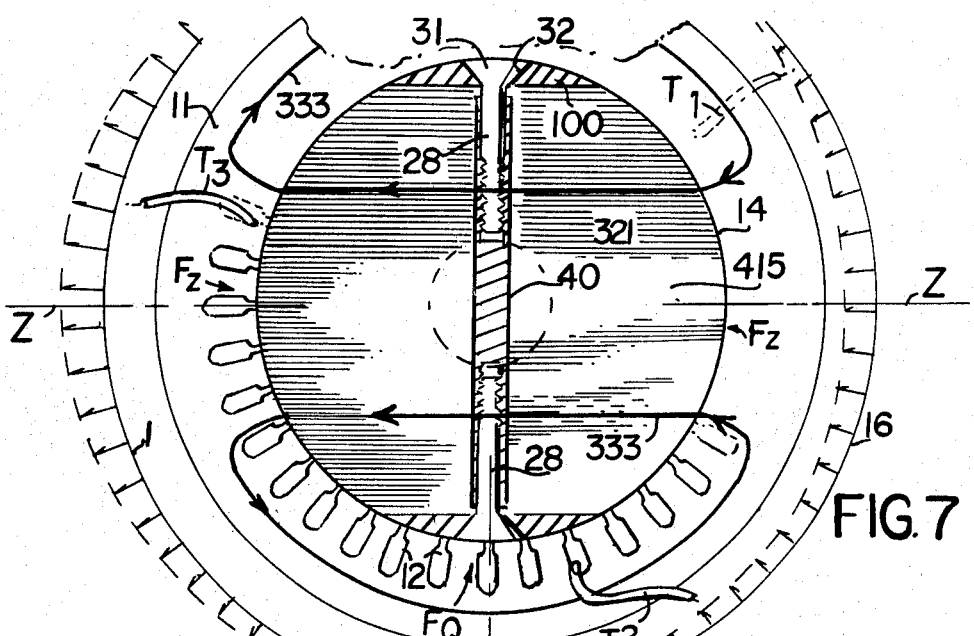
FIG. 7
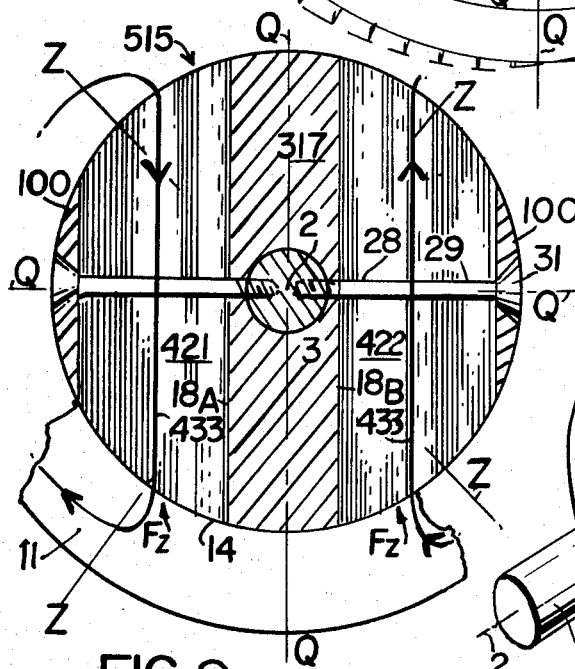
FIG. 9.
FIG. 8
ROBERT W. MENZIES
INVENTOR.
BY Lawrence E. Laubscher
ATTORNEY

SYNCHRONOUS RELUCTANCE MOTORS HAVING ROTOR SEGMENTS OF EXTENDED POLE SPAN

This invention relates to synchronous electric machines of the reluctance type wherein the rotor is assembled from stacks of nested curved strip elements, each element extending parallel to the rotor axis.

The improvement with which the invention is primarily concerned is the provision in a synchronous electric machine of a rotor construction having segmental magnetic bodies made of steel laminae stacked in the radial direction wherein the circumferential span of the segmental body is increased to span two consecutive stator MMF poles of opposite polarity, whereby higher power factor, higher efficiency, and greater synchronous torque are made possible, with the added advantage that the cost of rotor construction is markedly lowered.

The present invention is related to, and improves on, the synchronous electric machines proposed in a paper authored by Cruikshank, Menzies and Anderson in PROC. IEE, Vol. 113, No. 12, December 1966, wherein the fabrication of a rotor is described, involving the winding of resin-coated grain-oriented strip steel about a mandrel to form a unitary thick ring, cutting the ring into a number of like segmental bodies, and assembling the bodies symmetrically about the rotor shaft with the side edges of the strips machined to form cylindric surface portions of the rotor. In such prior art rotors, adjacent machined surfaces of consecutive segmental bodies share a common polarity, requiring that the rotor have as many segmental bodies as the number of stator MMF poles, or more properly, since no rotor direct axis passes through any segmental body, twice as many segmental bodies are required as the number of stator pole-pairs. The costs of fabrication of six-pole and eight-pole rotors are high, being larger for higher pole numbers for which a number of wound rings may be required.

A magnetic defect inherent in the sharing of stator pole flux by adjacent segmental bodies reduces the density of direct-axis rotor flux over the surface of each rotor core lobe below the optimum value, reducing maximum synchronous torque and decreasing the power factor of such prior art motors.

According to the present invention, a segmental rotor is fabricated by cutting the wound steel ring into segments of such angular span that each segmental body spans an arc of the stator manifesting a pair of adjacent MMF poles of opposite polarity. Each rotor pole thus comprises one cylindrically machined surface formed by the margins of a single stack of laminations, and hence presents a continuous arcuate surface of uniformly low reluctance to the stator MMF. Not only are obvious economies in fabrication confirmed, but far superior synchronous pull-out torque, power factor, and improved asynchronous performance result from the improved sinusoidal flux distribution in the air-gap and the higher flux density achieved.

The invention will be more particularly described in the following disclosure in conjunction with the accompanying figures of the drawing wherein.

Figure 1:
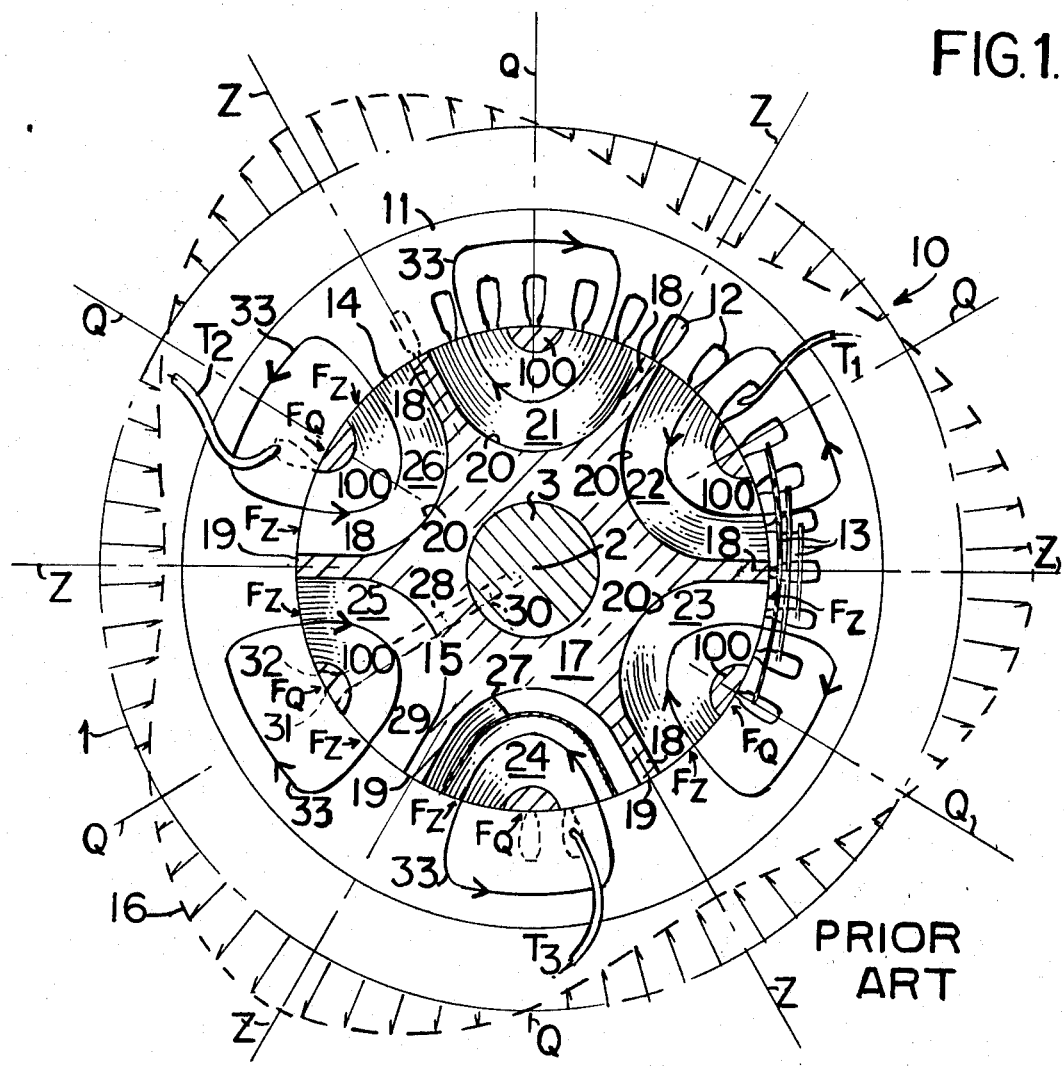
FIG. 1 is a cross section of a reluctance motor having a rotor of the prior art form carrying six segmental bodies, operating in a stator having windings to provide three MMF pole-pairs, the rotor direct axes being shown registered on the stator poles.
Figure 3:
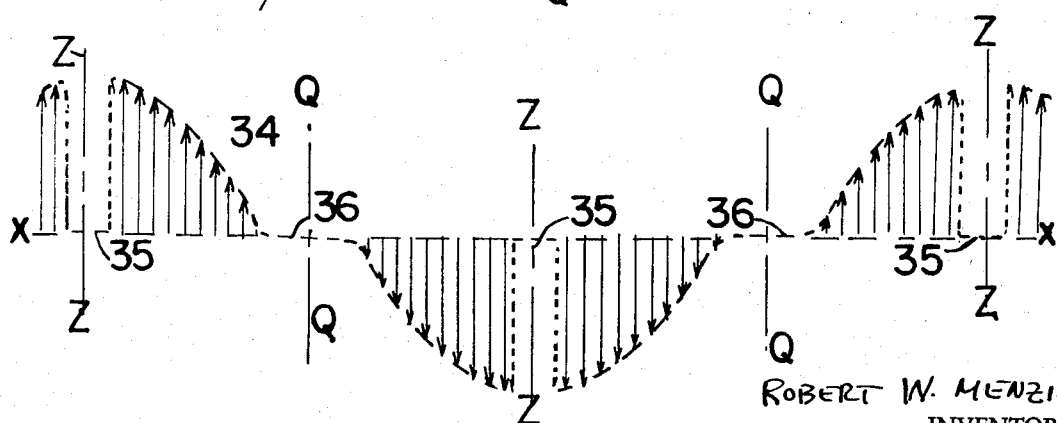
Figure 2:
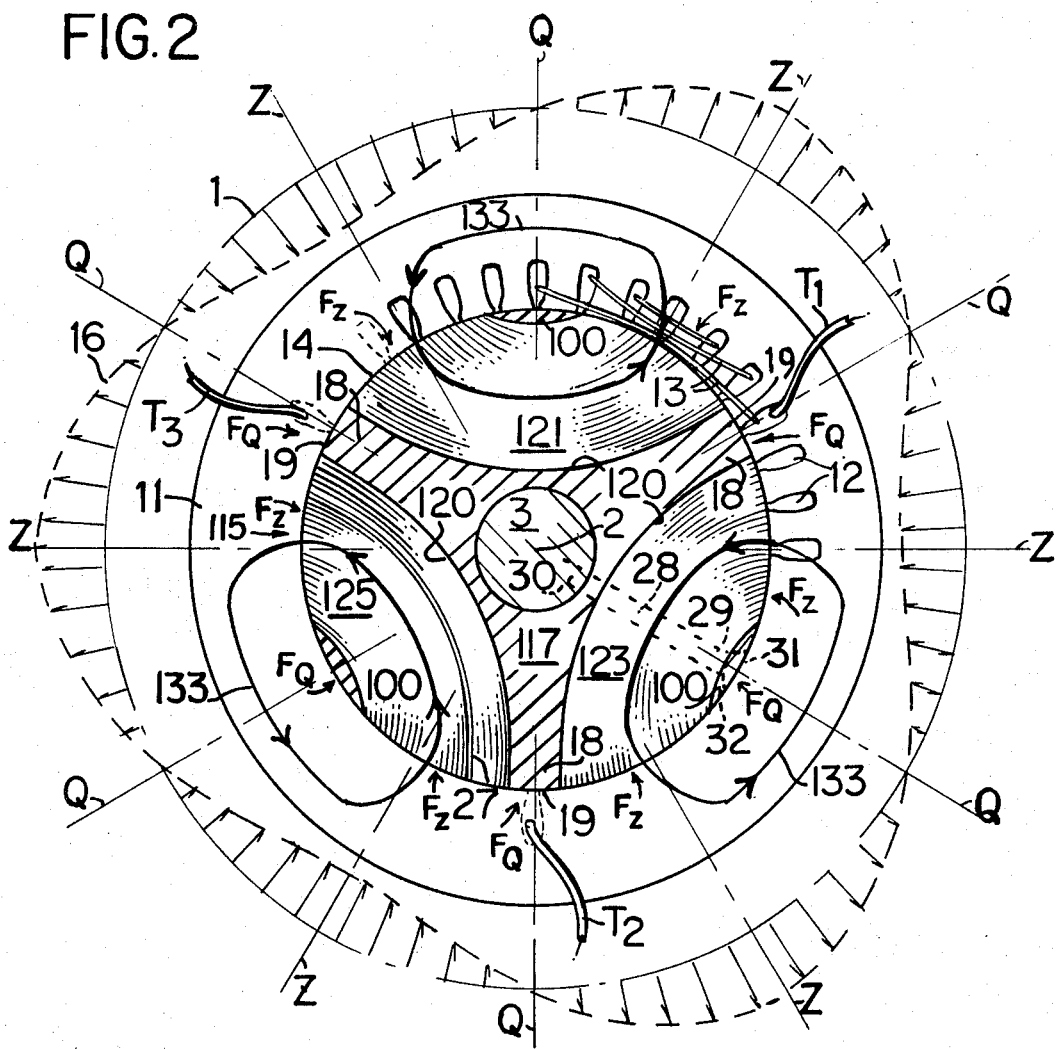
FIG. 2 is a cross section of the same motor provided with a rotor comprising but three segmental bodies according to the present invention, operating in the three-pole-pair stator field of FIG. 1; with the rotor direct axes shown also registered on the stator poles.
Figure 4:
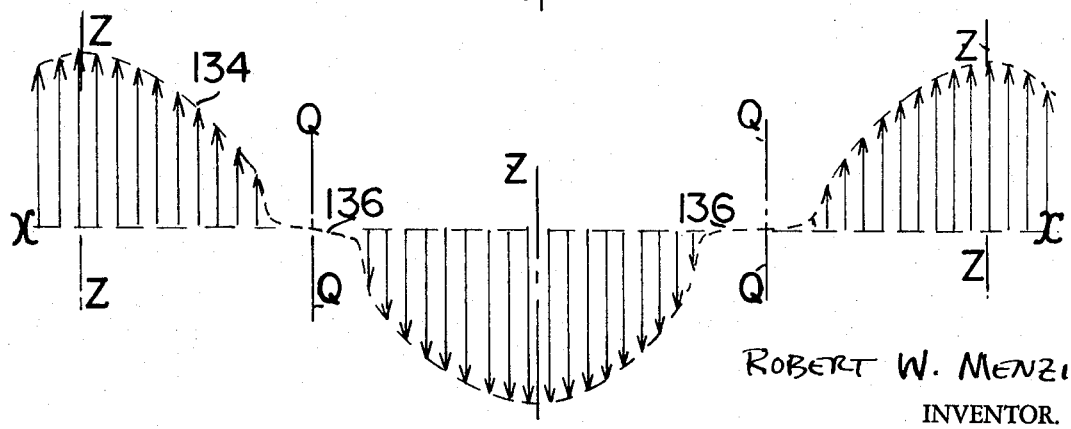
Figure 5:
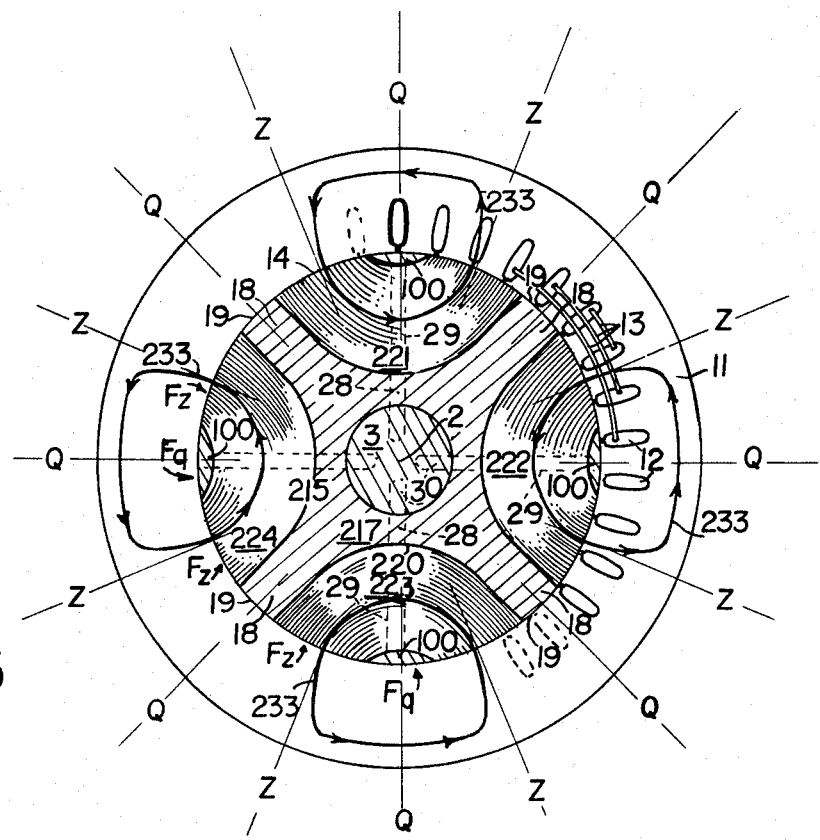
Figure 6:
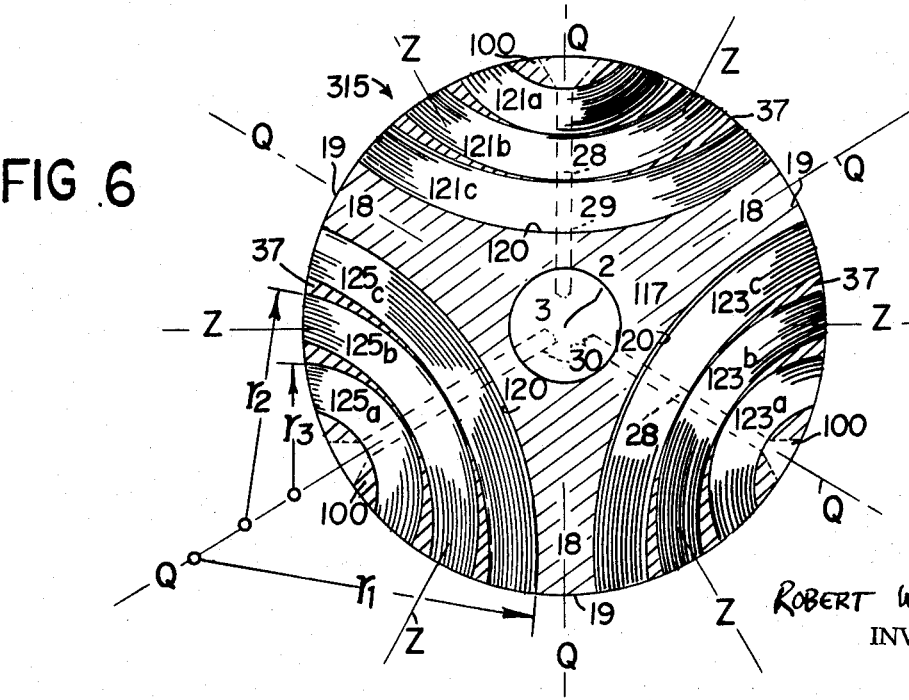

FIGS. 3 and 4 respectively are developed representations showing graphically the air gap flux densities for the motors of FIGS. 1 and 2;

FIG. 5 is a cross section of an alternative motor having a four-segmental body rotor according to the invention operating in a four-pole-pair stator MMF field;

FIG. 6 shows an alternative rotor construction providing three composite segmental bodies for operating in a three-pole-pair stator;

FIG. 7 shows a cross section of another reluctance machine having a single segmental rotor body lacking any rotor core, for use in a stator wound to provide a single pole-pair MMF field;

FIG. 8 is a perspective view of the rotor of FIG. 7 showing clamping and shaft support structure; and, FIG. 9 is a cross section of a rotor having a bar core carrying two segmental bodies for operating in a stator providing a two-pole-pair MMF field.

Before proceeding to the description of the preferred embodiments it will be helpful to review the prior knowledge of induction motors and synchronous reluctance machines, for a fuller comprehension of the novel principles and constructions contributed by this invention.

OPERATING PRINCIPLES OF ELECTRIC POLYPHASE RELUCTANCE MOTORS

The synchronous reluctance machine has a stator comprised of planar annular steel sheet elements, laminated axially in a manner to minimize eddy current losses, windings being carried in slots recessed into the internal surface and being energized so that at any instant the magnetizing force manifests a magnetic field having an even number of poles of alternate polarity uniformly spaced about the internal circumference. The MMF at any instant has a sinusoidal arcuate distribution. Such form of stator provides a rotating field just as does the stator of a polyphase or single phase induction motor or a polyphase or single phase synchronous machine.

In contrast with the rotor of a conventional induction motor which is made as an axially extended stack of discs carrying a conductive short-circuited cage winding in slots adjacent the rotor surface, the stack being characterized by uniform permeability in any radial direction, the rotor of the reluctance machine is characterized by magnetic asymmetry, i.e. the magnetic material is arranged to present widely differing permeability over specific surface portions. Certain surface zones extending parallel with the shaft exhibit low reluctance to magnetization by stator MMF and will be permeated by a large flux when a stator pole is presented to such zones, while other zones intermediate the high permeability zones exhibit very large reluctance. The magnetic asymmetry is designed to produce a sinusoidal flux distribution in the air gap when the poles of the rotating stator MMF are registered on the low reluctance zones of the rotor. At zero load, the rotor "locks on" the stator field and rotates synchronously with it in this relative position. With increased load, the relative position of the rotor and the rotating field changes by a small angle, developing a higher torque as the angle increases. At a certain critical load angle, i.e. when the angle between the rotor direct axis and the stator field pole axis exceeds about 45° (on the basis that an angle of 360° is subtended between a point on a stator pole of one polarity and a corresponding point on the next-following stator pole of the same polarity) the rotor pulls out of step and slows down, running as an induction motor.

In the publication referred to, a large increase in air-gap flux density in the direct axis of rotor magnetization has been shown to be realizeable by employing segmental bodies made up of nested curved grain-oriented strip steel, the easy direction of magnetization of which is along the lines of intersection with the strips of a segmental body by a radial plane normal to the shaft axis. In such prior rotor element the segmental bodies were so dimensioned as to span from about 115° to 170° of the stator field pole pitch, i.e. the pair of zones of low reluctance on one segmental body are presented toward a pair of stator MMF poles of opposite polarity. Each pair of adjacent segmental bodies thus present a pair of spaced-apart surfaces formed by the machined strip margins, together spanning about 65 percent to about 90 percent of the span of one MMF pole of the stator field. The low-reluctance surfaces of any segmental body are spaced apart by a structural bar which is non-magnetic, the spacing being a small fraction of the span of one MMF pole of the stator field. At zero load in synchronous running, the bar is opposite stator areas over which the field is zero or negligibly small.

COMPROMISES BETWEEN ASYNCHRONOUS AND SYNCHRONOUS

DESIGN OPTIMIZATION FOR RELUCTANCE MACHINE ROTORS

In the prior publication, it was pointed out that an optimum pole span of the rotor segmental bodies for synchronous running to attain maximum pull-out torque would be as close to 100 percent as structural integrity may tolerate, since optimum torque and power factor are related to maximum flux density in the air-gap in the rotor direct axes and to minimum flux density in the air-gap in the rotor quadrature axes. The maximum torque $T_M$ is proportional to:

$$(^xD - {^xQ})/ X_D \cdot X_Q \quad (1)$$

and the maximum power factor, $\cos \phi_M$ is proportional to $$(^xD - {^xQ})/ (X_D + x_Q) \quad 2)$$

where:

$X_D$ is stator reactance for the rotor position registering the direct-axes on the MMF poles of the stator field; and $X_Q$ is stator reactance for the rotor position registering the quadrature-axes on the MMF poles of the stator field.

Because it will usually be necessary to accelerate the rotor by the development of asychronous torque, in the machine rather than by applying external drive, it is necessary to design the rotor for effective operation at sub-synchronous speeds as a cage-wound rotor for an induction motor.

The magnitude of the sub-synchronous torque $T_a$ depends on the conducting material which forms low-resistance closed circuits about the rotor wherein large currents may circulate due to voltages induced by rotor slip relative to stator flux. Since the entire volume of the rotor core in which the segmental bodies are carried may be a homogenous and highly electrically conducting mass of metal such as aluminum, and at least one massive bar of the same material can be disposed in the rotor surface centrally of each segmental body and welded to the core, the very low resistance loops thus provided achieve excellent accelerating torque and damping.

Referring now to FIGS. 1 through 6, the improvement in increased direct-axis flux density realized in rotors constructed according to the invention will be clearly made evident from the comparison of the air-gap flux density and its distribution in the prior art narrow pole-span segmental body form with the flux density and distribution achieved in the widened pole-span segmental body form of the present invention.

PRIOR ART ROTOR CHARACTERISTICS

A reluctance machine 10 according to the prior art is shown in diametral section in FIG. 1, and in FIG. 3 the air-gap flux density is graphically represented in Cartesian coordinates.

For purposes of illustration the machine may be considered to be supplied from a three-phase electrical supply (not shown) led to the field winding terminals $T_1$, $T_2$, $T_3$. A known form of stacked-disc stator body 11 carries in slots 12 recessed into its interior surface a distributed three-phase winding, only one coil 13 of which is illustrated. The arrangement of conductors wound as coil groups in stator slots is believed to be well understood by those aware of the art of induction motors. Such windings, arranged by known techniques, produce at any instant a sinusoidal MMF distribution in the air-gap 14 between the stator 11 and the rotor 15, and in the present example such field will be assumed to comprise 6 poles, i.e. three pole-pairs.

Assuming that the motor is operating as a synchronous motor with zero load, the effect of current in the phase windings will be to set up the field pattern graphically depicted for a specific instant of time by the dashed envelope line 16 traced externally about the periphery of the stator, the ordinate value and the direction of the field being depicted by the radial arrows extending from the reference circle 1. Such pattern, of course, would be revolving at an angular speed, in radians per second, of:

$$d\theta/dt = 2f/P$$

where:

$d\theta/dt$ is angular velocity in radians per second, $f$ is supply frequency in Hertz, $P$ is the total number of stator poles.

Rotor 15 essentially consists of a massive central core 17 revoluble about an axis 2 centered in the support shaft 3. The core is formed of a conductive non-magnetic metal such as aluminum or its alloys. It is shaped as an axially extended body having six lobes 18 extending into the rotor surface and terminating in narrow arcuate sectoral surfaces 19 located equidistant from stator 11. Twelve zones of the rotor cylindric surface exhibiting low reluctance occupy the sectors designated $F_Z$ and are arranged in pairs on either side of lobes 18, thus manifesting six rotor poles, while other surface portions occupy sectors $F_Q$ exhibiting high reluctance, i.e. these zones are difficult to magnetize.

The core 17 is formed with six trough-shaped seating surfaces 20 disposed between the lobes, in which the segmental bodies 21—26 are respectively secured. Each segmental body comprises a radially stacked group of closely nested thin curved strips or sheets such as that indicated by numeral 27, the sheet material being a grain-oriented steel having high unidirectional permeability. The direction of easy magnetization is aligned with any plane passed through the rotor perpendicular to the axis 2 so that the reluctance of a path extending from one sector $F_Z$ bounding the exposed side edges of the strips of one stack to a corresponding sector $F_Z$ bounding the other side edges of these strips is extremely low, whereas the reluctance of a path in the axial direction is much higher, while the reluctance of a path intersecting the sheets at right angles is greatly higher still.

Each stack of steel sheets is held in radially compressed condition by a retaining bar 100 extending parallel with the rotor axis 2 and having the outer side formed as a cylindrical surface lying in the rotor surface. Such retaining bars are preferably also made of a non-magnetic metal such as aluminum or copper, and are preferably supported on the core by threaded bolts 28 of non-magnetic high-strength alloy such as a stainless steel passing through bores 29 piercing each steel sheet 27 midway between the side edges and being threadedly engaged by their inner ends in suitably threaded bores 30 in shaft 3. Conic heads 31 are seated in countersunk recesses 32 in the outer face of a bar 100.

Considering now the MMF curve 16 representing the "locked on" relationship of MMF field and rotor structure, a field pole of one polarity, for example an "N" pole has its peak intensity adjacent a core lobe surface 19 and hence develops rotor magnetization of the same polarity in the pair of adjacent surfaces $F_Z$, for instance in segmental bodies 26 and 21. The next consecutive field pole, proceeding clockwise around axis 2, is an "S" pole similarly straddling that core lobe which spaces apart the surfaces $F_Z$ of segmental bodies 21 and 22, developing rotor magnetization in these surfaces which is of a polarity opposite to that in the pair of surfaces of bodies 26—21. The rotor therefore has as many poles as the total MMF poles comprising the stator field, or twice as many segmental bodies are required as the number of pole-pairs of MMF.

The MMF field adjacent the sectors $F_Q$ which are centered on the retaining bars 100 is negligibly small or zero. The quadrature axes Q—Q may therefore be drawn as three diametral lines bisecting pairs of retaining bars 100 and also bisecting the associated segmental bodies 21, 24, 22, 25, and 23, 26. The rotor direct axes Z—Z similarly comprise a set of three diametral lines bisecting the opposed core lobes 18 and also bisecting the peak intensity MMF field plots.

The flux distribution will therefore be traced along six closed-loop paths designated by solid lines 33 indicating the mean path followed by the flux in the stator and along a curved portion within the segmental bodies, the sense of the flux being shown by directional arrow markings.

Referring now to FIG. 3, the interrupted envelope line 34 represents ordinate values of flux density above and below the horizontal reference line x—x representing the rotor periphery and showing therealong the relative positions of the direct axes Z—Z and quadrature axes Q—Q. It will be evident that although portions of the line 34 more or less conform to the desired sinusoidal flux distribution, virtually negligible flux is set up along a narrow band 35 centered on each direct axis position. This may be understood from FIG. 1 wherein the core lobes 18 will be seen to present surfaces of very high reluctance centered opposite peak MMF plots. It may also be seen that if the complete sine-curve had been traced, a higher peak flux density and a larger total flux would be represented in place of the gaps 35.

The high reluctance of the rotor sectors $F_Q$ is shown by insignificant flux density in the air gap over a relatively wide band 36 centered on each quadrature axis position Q—Q, hence such rotors have low $X_Q$, as desired. However the maximum $X_D$ value is less than ideal, so that correspondingly reduced maximum torque $T_M$ and power factor Cos $\phi_M$ are evident from relations (1) and (2). Not only is the fundamental Fourier component of the flux-density distribution diminished, but higher odd-numbered harmonic components, particularly the fifth, have large amplitudes, causing harmonic time-varying torques and induced harmonic voltages at subsynchronous speeds that are detrimental to the starting of the motor. The magnitudes of the undesirable harmonic components of flux density distribution will be apparent from the following relation: $B_{(,n)} = \mu_0 f/g \cdot \sin(\alpha - p B_o) \Sigma b_n \sin n(p\theta - \omega t - p B_o)$..(3) where phase $a$ is considered the leading phase with current $i_a = I \sin(\omega t + \alpha)$ and $f$ is the maximum amplitude of the fundamental component of stator MMF;

$g$ is the effective radial length of air-gap (14);

$u_0$ is the permeability of free space;

$B_o$ is the angular position of the rotor quadrature axis Q—Q with respect to the axis Z—Z of stator phase $a$; ($t=0$) and, $b_n$ is the Fourier coefficient of the $n^{th}$ spatial harmonic flux-density distribution.

When the rotor direct axes Z—Z are aligned, as illustrated, with the peak intensity positions of the stator MMF poles, then
$$p B_o = \alpha \pm \pi/2$$
and equation (3) may be written:

$$B_{(\theta,t)} = _{n=1_{odd}} B_{d_n} \sin n(p\theta - tpB_o)$$

where $$B_{d_n} = \frac{u_0 f}{g} b_n$$

and is the magnitude of the $n^{th}$ harmonic component of the air-gap flux density distribution.

For $n = 1$ the fundamental direct-axis flux density distribution and hence the direct-axis reactance $X_D$ which is proportional to $B_{d_1}$ should clearly be as large as possible. As $B_{d_n}$ is directly proportional to $b_n$, the value of $b_1$ should be maximum, while the harmonic coefficients (i.e. $n = 3, 5, 7 \ldots$) should be as small as possible in order to prevent the development of harmonic torques and induced harmonic voltages. Within mechanical design limits, chiefly dictated by considerations of securing the segmental bodies to the rotor core and of providing adequate cross-sectional areas of cage circuits carrying damping currents, the arcuate spans of lobes 18 and of bars 100 may be varied. An inspection of the waveform 34 will show that these parameters control the width of gaps 35. Those skilled in motor design art will be aware that a given variation of these arcuate spans will minimize predetermined odd-numbered harmonics, but cannot augment the fundamental. In general, in carrying out a specific machine design, an accurate analysis and computation of air-gap flux density distribution will be carried out to arrive at optimum values of $b_n$.

As an example of prior art reluctance machine analyses, the $b_5$ Fourier coefficient for the flux density distribution curve 34 in the gap 14 between a stator of four MMF pole-pairs and a rotor carrying eight segmental bodies, was calculated to have an amplitude 30 percent of the fundamental.

PREFERRED RELUCTANCE MOTOR EMBODIMENTS

Referring now to FIGS. 2 and 4, a reluctance motor 10 according to the invention has a stator 11 and windings such as 13 identical in all respects with the stator and windings of the machine of FIG. 1, but has a modified rotor 115 comprising a core 117 with three lobes 18 and three concave seating surfaces 120, on which are mounted three segmental bodies 121, 123, and 125. The construction of these segmental bodies is in accordance with the description of similar bodies in the prior art machine of FIG. 1, i.e. they comprise stacks of nested curved laminations extending in the axial direction, having strip margins exposed in the rotor cylindrical surface occupying the arcuate spans $F_Z$, which have a sectoral span which is the larger part of one stator MMF pole span. The direct axes Z—Z are represented by three diametral lines, which will each be seen to bisect a pair of opposite sectors $F_Z$. Each segmental body such as 121 spans a maximum arcuate length nearly equal to the span of two consecutive stator MMF poles. Three diametral lines Q—Q representing rotor quadrature axes alternately pass through the rotor core 117 bisecting the cylindrical surfaces 19 of lobes 18, and bisecting the sectors $F_Q$, i.e. passing through the radially deepest part of a lamination stack.

An examination of the air-gap flux density distribution represented by the waveform 134 in FIG. 4 shows that the distribution is more nearly sinusoidal than the corresponding envelope 34 of the prior art machine of FIG. 3. Moreover, the maximum flux density is about 20 percent higher than the maximum amplitude in waveform 34. It will be immediately apparent that the total flux in the air gap in the machine of FIG. 2 is considerably higher than in the prior art machine because there is no gap in the peak-flux density position.

Table I shows the magnitudes of Fourier coefficients of the air-gap flux density distribution for reluctance machines having stator fields of six-pole and eight-pole form, rotors "A" being of prior art form wherein each rotor pole comprises one surface sector $F_Z$ of each of a pair of adjacent segmental bodies, and rotors "B" being constructed according to the present invention wherein each rotor pole comprises the surface $F_Z$ of a single segmental body spanning nearly one stator MMF pole.

TABLE I

| | Reluctance machines | | | |
|---|---|---|---|---|
| | Six-pole | | Eight-pole | |
| Magnitude of $n^{th}$ harmonic, $b_n$ | "A" | "B" | "A" | "B" |
| 1 | 0.894 | 0.968 | 0.810 | 0.968 |
| 3 | 0.047 | 0.078 | 0.078 | 0.078 |
| 5 | 0.144 | 0.096 | 0.245 | 0.096 |
| 7 | 0.026 | 0.079 | 0.061 | 0.079 |

When the stator MMF field in the machine of FIG. 2 has rotated out of synchronous "locked on" relation so as to align the rotor quadrature axes with the peak MMF positions, presently illustrated as coinciding with the Z—Z axes, it will be evident that virtually negligible flux would be set up either along the laminations, or transverse to their thickness. This will be evident from a consideration that each strip will have its exposed margins disposed in field positions of the same polarity and intensity. As has previously been stated, the reluctance along a rotor Q—Q axis is low due to the interlaminar films of bonding resin spacing such strips apart radially. Thus, the modification of the segmental body form of rotor according to the invention does not result in any increase in the value of $X_Q$, and the efficiency will be high.

The greater magnetic cross section of rotor segmental body material available for conducting a high total magnetic flux and realizing high air-gap flux density in multipole reluctance machines constructed according to the invention will be particularly apparent from a study of the motor embodiments illustrated in FIGS. 2, 5, 6, 7, 8 and 9. Considering FIG. 5, wherein a rotor 215 comprises four segmental bodies 221, 222, 223 and 224, operating in a stator 11 providing four MMF pole-pairs, by comparison with a prior art machine of the same rotor diameter and rotor pole number it will be found that the volume of each of the four segmental bodies is somewhat larger than the combined volumes of the pair of adjacent segmental bodies which would carry the flux of one stator MMF pole in the prior design consisting of eight segmental bodies. The pole flux, represented by the closed path 233, will also be found to be considerably greater. If the arcuate width of the cylindrical surfaces 19 of lobes 18 is narrowed still further and the concave seating surfaces 220 deepened in the core 217 accordingly, the stack of laminations nested therein may be correspondingly thickened, gaining still greater pull-out torque.

Where the motor is required to develop large asynchronous torque while running up as an induction motor, and yet have good pull-out torque under synchronous operation, the form of rotor 315 of FIG. 6 may be utilized. In this construction, interlaminar films or layers 37 are deliberately thickened and interleaved with the steel. Each segmental body is thus divided into a number of subbodies, for example three, namely, 121a, 121b, 121c; 122a, 122b, 122c; and 123a, 123b, 123c, wherein the curved steel strips are wound on mandrels of different radii. As diagrammed, segmental bodies 125c—a have respective radii $r_1$, $r_2$, $r_3$ swung on centers $P_1$, $P_2$, $P_3$ lying radially outward from the rotor surface along a Q—Q axis at progressively decreasing distances, so that the nearer the sub-body lies to the rotational axis 2 of the rotor, the longer is its generating radius.

When the interlaminar material 37 occupying the spaces between adjacent segmental sub-bodies is a conductive metal integrally bonded with end disc structure (as shown in FIG. 8) which structure is itself integrally bonded to the core 117, the cross-sectional area of the damper loops so provided is high. The retaining bolts 28 may be of electrically conductive material but should be non-magnetic to preserve low $X_Q$. The shaft 3 may be of magnetic material such as steel as in other embodiments having through-shafts.

It will be apparent that rotors of machines according to the present invention may be constructed to operate in stators providing fields of any feasible number of MMF pole-pairs, only one segmental body being required for each pole-pair. The lowest possible number of segmental bodies is one; in FIG. 7 a cross section is shown of a motor having a rotor 415 formed as a single segmental body 321, operating in a stator providing an MMF field of one pole-pair, as depicted by the dashed outline or waveform 16 relative to the circular reference line 1. In FIG. 8 the rotor and shaft construction is shown in perspective view. It will be evident that the laminae 27 are all flat strips, extending in chordal planes parallel with the axis 2, clamped by a pair of retaining bars 100 engaged by transverse non-magnetic bolts 28 passing through the entire rotor assembly and being threadedly engaged in sleeve 40.

While two flux paths 333 are shown as though extending in opposite halves of the stator, the magnetic flux set up in the segmental body 321 is actually unidirectional, i.e. the rotor is truly a 2-pole device, and the flux is distributed over each sector $F_z$ in accordance with the MMF potential between opposite margins of each strip. The rotor direct axis Z—Z comprises one diametral line parallel with the laminae, and is intersected at right angles by the single diametral line Q—Q representing the rotor quadrature axis.

The clamping bars 100 have their ends electrically and mechanically bonded, as by welding, to non-magnetic electrically conductive end discs 41, while the stack of steel strips is held compressed. It is the bars 100 together with the integral end discs which form the electrically closed circuit in a plane transverse to the laminae which provide a large damping capability.

Stub shafts 3A secured rigidly in bores 42 coaxial with the end discs 41 protrude axially of the rotor. The end discs should be amply thick to provide the required rigidity and strength.

Machines of the form of FIGS. 7 and 8 obviously comprise the most simple construction of the invention, and have the highest synchronous speed.

The embodiment shown in FIG. 9 is similar to that of FIGS. 5, 7 and 8 except that the rotor 515 comprises two magnetically separate segmental bodies 421, 422, and operates in a stator providing an MMF field of two pole-pairs. As explained for FIG. 7, end discs 41 are integrally bonded with the central massive electrically conductive non-magnetic supporting bar 317 of aluminum or its alloys, the bar having parallel side faces 18A, 18B disposed equidistantly from the axis 2 of shaft 3 centered in the bar. Cylindrical surfaces 19 lie radially equidistant from the axis 2 in the rotor cylindric surface at gap 14.

Each segmental body 421, 422 comprises a radially stacked group of closely nested flat sheets or strips such as sheet 27 having their direction of easy magnetization aligned in the chordal direction of the rotor, there being two sectors $F_z$ representing individual rotor poles per segmental body. Each body is held in compressed condition by the retaining bar 100 which subtends an angle of about one radian at the shaft axis 2, the bars being engaged by fastening means such as bolts or rivets 28 having their inner ends secured in the shaft 3 as by threaded connection 29, 30 illustrated.

When such form of rotor is disposed in a stator with the two diametral lines Z—Z aligned with the peak intensity positions of four MMF field poles of the stator, the magnetic flux loops linking both stator and rotor will be as represented by the mean paths 433.

Zero or negligible flux will be set up across the segmental bodies in the Q—Q axis, due to the very high reluctance of the bar core 317.

From the foregoing, it will be apparent that regardless of the number of pole-pairs provided by the stator winding, motors according to the present invention will have the highest possible pull-out torque, surpassing the pull-out torque for any prior art reluctance machine, while objectionable harmonics induced in the circuits will be minimized.

I claim:

1. An electric motor of the reluctance type having a wound stator member and a rotor member revolvable in said stator and spaced therefrom by an annular air-gap, said stator having a winding providing, when energized, a rotating MMF field comprising a predetermined number of pole-pairs, said rotor comprising a non-magnetic damping structure, and a number of ferro-magnetic bodies of segmental form carried by said damping structure adjacent said air gap, said number of bodies corresponding to said predetermined number of stator pole-pairs, each of said segmental bodies having a pair of direct magnetization axes intersecting said body and spanning an arc corresponding to the angular span of two consecutive MMF field poles.

2. An electric motor as claimed in claim 1, wherein said damping structure comprises conducting end discs, and integral conducting bar elements each associated with a corresponding segmental body, respectively, for joining said end discs and disposed adjacent said air-gap, each segmental body and the single bar element associated therewith being bisected by a quadrature axis.

3. An electric motor as claimed in claim 2 wherein said predetermined number is one.

4. An electric motor as claimed in claim 2 wherein said predetermined number is two or more.

5. An electric motor as claimed in claim 4 wherein said damping structure further comprises non-magnetic core structure extending axially between said end discs and being integral therewith and having lobe portions extending radially and bounded by said air gap, and wherein a quadrature axis bisects each lobe.

6. An electric motor as claimed in claim 5 wherein said core has two opposed lobes and supports two segmental bodies, each body comprising a group of radially stacked axially elongate flat sheets having high permeability along at least one dimension of the sheet.

7. An electric motor as claimed in claim 4 wherein said core has three or more equiangularly disposed lobes and has concave seating surfaces disposed between the lobes, each seating surface supporting one segmental body therein, and each body comprising a group of radially stacked axially elongate nested curved sheets having high permeability along at least one dimension of the sheet.

8. An electric motor as claimed in claim 7 wherein each said segmental body comprises a plurality of sub-stacks of curved sheets in radially stacked relation, the radii of curvature of the sheets of respective sub-stacks decreasing inversely with distance of the sub-stack from the core, and said damping structure includes conductive non-magnetic material interleaved between said sub-stacks and bonded electrically with said end discs.

* * * * *